(12) United States Patent
Yamaguchi et al.

(10) Patent No.: US 9,785,394 B2
(45) Date of Patent: Oct. 10, 2017

(54) IMAGE PROCESSING SYSTEM, IMAGE PROCESSING APPARATUS, MOBILE TERMINAL, AND PROGRAM FOR TRANSMISSION OF IMAGE DATA

(71) Applicant: Konica Minolta, Inc., Tokyo (JP)

(72) Inventors: Takehisa Yamaguchi, Nara (JP); Takeshi Minami, Hyogo (JP); Toshihiko Otake, Osaka (JP); Daisuke Nakano, Osaka (JP); Yasutaka Ito, Hyogo (JP); Atsushi Ohshima, Hyogo (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/215,096

(22) Filed: Jul. 20, 2016

(65) Prior Publication Data

US 2017/0024177 A1    Jan. 26, 2017

(30) Foreign Application Priority Data

Jul. 22, 2015    (JP) .................................. 2015-144756

(51) Int. Cl.
*G06F 3/12*    (2006.01)

(52) U.S. Cl.
CPC .......... *G06F 3/1292* (2013.01); *G06F 3/1203* (2013.01); *G06F 3/1236* (2013.01); *G06F 3/1268* (2013.01)

(58) Field of Classification Search
None
See application file for complete search history.

(56) References Cited

U.S. PATENT DOCUMENTS

| 8,632,266 B1* | 1/2014 | Simmons | G06F 3/1292 347/109 |
| 2013/0050753 A1* | 2/2013 | Sako | G06F 3/1204 358/1.15 |
| 2013/0057910 A1* | 3/2013 | Matsumoto | G06K 15/402 358/1.15 |

(Continued)

FOREIGN PATENT DOCUMENTS

| JP | 2009-176159 A | 8/2009 |
| JP | 2014-045418 A | 3/2014 |

*Primary Examiner* — Ming Hon
(74) *Attorney, Agent, or Firm* — Osha Liang LLP

(57) ABSTRACT

An image processing system where an image processing apparatus that includes an image data transmitting function and a mobile terminal that includes an electronic mail transmitting function operate to link with each other, the image processing apparatus including: a startup instruction transmitting unit; an image data acquiring unit; a transmission destination designation information acquiring unit; and an image data transmitting unit, and the mobile terminal including: an electronic mail function starting unit that starts up the electronic mail transmitting function and causes a predetermined display unit to display address information; a transmission destination designation information transmitting unit that receives an operation of designating a transmission destination address among the address information and transmit the transmission destination designation information to the image processing apparatus; and an attached file output unit that outputs the image data as an attached file of an electronic mail.

23 Claims, 10 Drawing Sheets

(56) References Cited

U.S. PATENT DOCUMENTS

| | | | | |
|---|---|---|---|---|
| 2013/0169976 A1* | 7/2013 | Yamada | ............... | G06F 3/1204 |
| | | | | 358/1.2 |
| 2014/0320915 A1* | 10/2014 | Owari | ............... | H04N 1/00387 |
| | | | | 358/1.15 |
| 2015/0350905 A1* | 12/2015 | Suzuki | .................. | H04L 63/08 |
| | | | | 726/7 |

\* cited by examiner

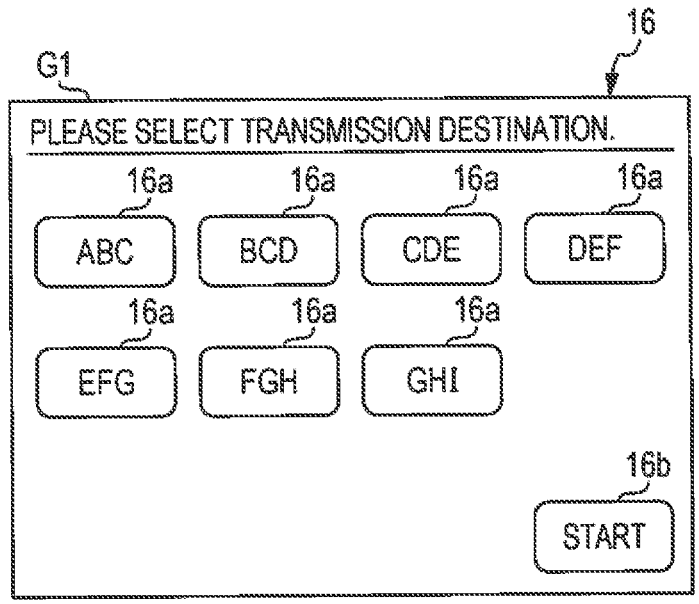

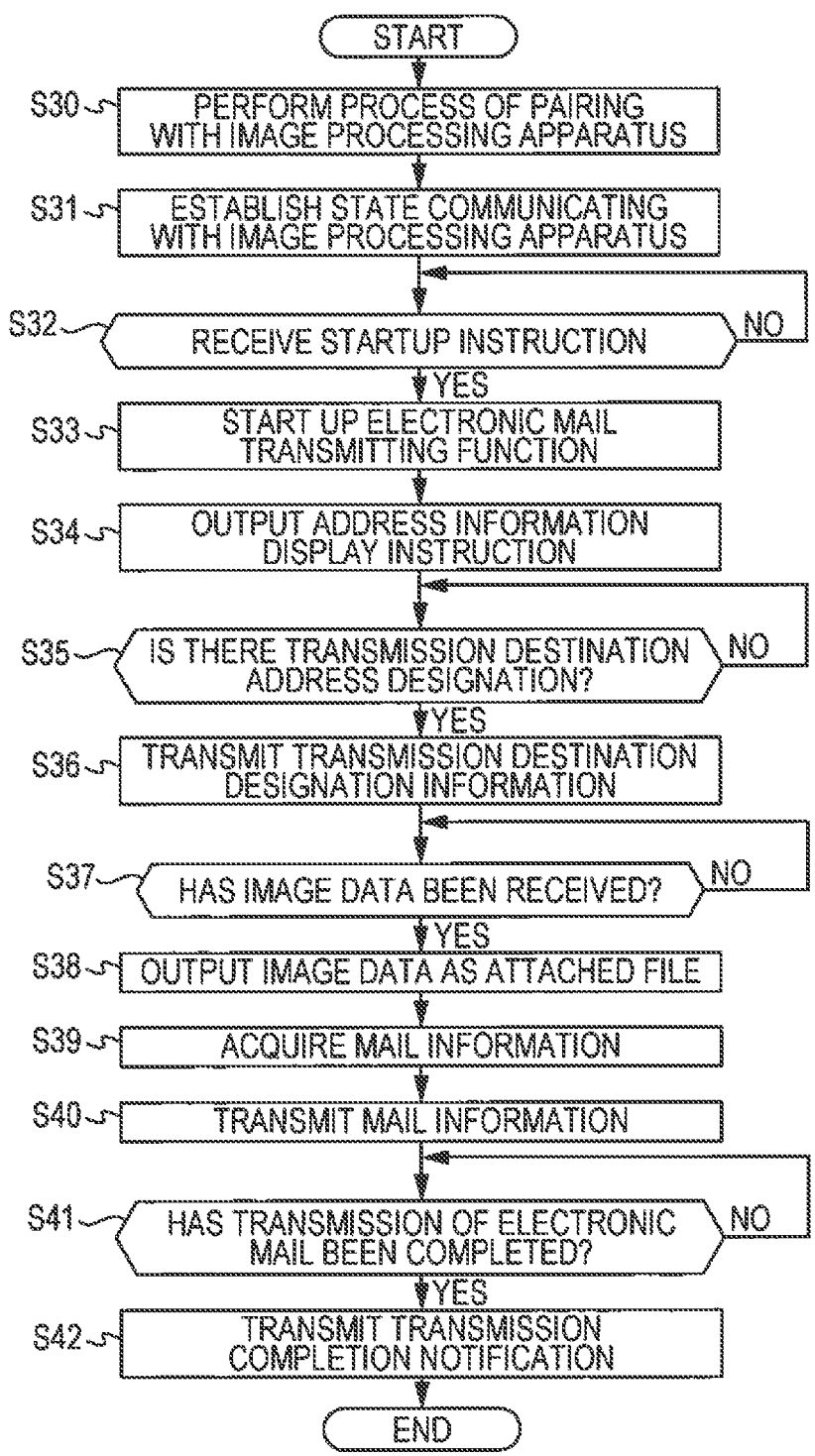

IMAGE PROCESSING SYSTEM, IMAGE
PROCESSING APPARATUS, MOBILE
TERMINAL, AND PROGRAM FOR
TRANSMISSION OF IMAGE DATA

The entire disclosure of Japanese Patent Application No. 2015-144756 filed on Jul. 22, 2015 including description, claims, drawings, and abstract are incorporated herein by reference in its entirety.

BACKGROUND OF THE INVENTION

Field of the Invention

The present invention relates to an image processing system, an image processing apparatus, a mobile terminal, and a program and, more particularly, to an image processing system in which an image processing apparatus and a mobile terminal are linked to each other.

Description of the Related Art

Conventionally, image processing systems are known in which an image processing apparatus such as an MFP (Multifunction Peripherals) and a mobile terminal such as a tablet terminal are linked to each other in the state of being communicable in a wired or wireless manner so as to perform various processes (for example, see JP 2014-45418 A).

In addition, among image processing systems in which an image processing apparatus and a mobile terminal are linked to each other, a system has been proposed in which the image processing apparatus transmits web screen information to the mobile terminal in response to a request from the mobile terminal, and the mobile terminal displays the web screen information (for example, 2009-176159 A). According to such a conventional technology, in the web screen information displayed using the mobile terminal, a button image used for an instruction for transmission of FAX or an electronic mail and the like are included. When such a button image is operated by a user, the image processing apparatus transmits FAX or an electronic mail to a transmission destination designated by the original web screen information.

An image processing apparatus such as an MFP can transmit image data read using a scanning function to the outside within being attached to an electronic mail. In such a case, in a transmission source address of the electronic mail, an address set to the image processing apparatus in advance is recorded. Meanwhile, generally, an image processing apparatus installed to an office or the like is shared by a plurality of users. For this reason, for example, in a case where an electronic mail to which image data is attached is transmitted to the outside by each user by using the image processing apparatus, a recipient of the electronic mail cannot perceive a user who has transmitted the mail.

In order to prevent such a situation, for example, a transmission form may be considered to be employed in which an image processing apparatus and a mobile terminal possessed by a user are linked to each other, image data read using a scanning function of the image processing apparatus is fetched into the mobile terminal once, and an electronic mail is transmitted from the mobile terminal to the outside. In a case where an electronic mail is transmitted from a user's individual mobile terminal, an electronic mail address of the individual user is recorded in the field of a transmission source address, and accordingly, a recipient of the mail can specify a person who has transmitted the mail.

However, in a case where the transmission form in which an electronic mail is transmitted from each mobile terminal as described above is employed, the user needs to perform a complicated operation. In other words, in case of the transmission form described above, a user, first, after reading an image of a document using a scanning function by operating the image processing apparatus, needs to convert image data generated using the scanning function into image data of a data format that can be handled by the mobile terminal by further operating the image processing apparatus and then, perform an operation of fetching the image data into the mobile terminal. Then, after the image data is fetched into the mobile terminal, the user needs to start up an electronic mail transmitting function such as a mailer by operating the mobile terminal and perform an operation of designating the image data fetched from the image processing apparatus as an attached file. Accordingly, in a case where image data is fetched into the mobile terminal from the image processing apparatus, and an electronic mail is transmitted, a user's operation is complicated, and convenience is degraded.

SUMMARY OF THE INVENTION

One or more embodiments of the invention provide an image processing system, an image processing apparatus, a mobile terminal, and a program improving the convenience at the time of transmitting image data to the outside by reducing a user's operation burden by automatically linking an image processing apparatus and a mobile terminal to each other.

(1) One or more embodiments are provided with an image processing system, in which an image processing apparatus having an image data transmitting function and a mobile terminal having an electronic mail transmitting function operate to be linked with each other, the image processing apparatus comprises: a startup instruction transmitting unit configured to transmit a startup instruction of the electronic mail transmitting function to the mobile terminal and display address information managed using the electronic mail transmitting function in the mobile terminal in a case where the image data transmitting function is selected; an image data acquiring unit configured to acquire image data that is a transmission target in the image data transmitting function; a transmission destination designation information acquiring unit configured to acquire transmission destination designation information representing that a transmission destination address of the image data acquired by the image data acquiring unit is designated from the mobile terminal after the startup instruction is transmitted by the startup instruction transmitting unit; and an image data transmitting unit configured to transmit the image data acquired by the image data acquiring unit to the mobile terminal in a case where the transmission destination designation information is acquired from the mobile terminal by the transmission destination designation information acquiring unit, and the mobile terminal comprises: an electronic mail function starting unit or circuit configured, accompanying reception of the startup instruction from the image processing apparatus, to start up the electronic mail transmitting function and cause a predetermined display unit to display address information managed using the electronic mail transmitting function; a transmission destination designation information transmitting unit configured to receive an operation of designating a transmission destination address among the address information displayed by the display unit and transmit the transmission destination designation information to the image processing apparatus; and an attached file output unit configured to output the image data as an attached file of an electronic mail generated using the electronic mail transmitting function in a case where the image data is received from the image processing apparatus.

(2) In one or more embodiments, an image processing apparatus capable of performing an operation to be linked with a mobile terminal having an electronic mail transmitting function comprises: a startup instruction transmitting unit configured to transmit a startup instruction of an electronic mail transmitting function to the mobile terminal and display address information managed using the electronic mail transmitting function in the mobile terminal in a case where the image data transmitting function transmitting image data is selected; an image data acquiring unit configured to acquire image data that is a transmission target in the image data transmitting function; a transmission destination designation information acquiring unit configured to acquire transmission destination designation information representing that a transmission destination address of the image data acquired by the image data acquiring unit is designated from the mobile terminal after the startup instruction is transmitted by the startup instruction transmitting unit; and an image data transmitting unit configured to transmit the image data acquired by the image data acquiring unit to the mobile terminal in a case where the transmission destination designation information is acquired from the mobile terminal by the transmission destination designation information acquiring unit.

(3) In one or more embodiments, a mobile terminal having an electronic mail transmitting function and being capable of performing an operation to be linked with an image processing apparatus comprises: an electronic mail function starting unit configured, accompanying reception of the startup instruction of the electronic mail transmitting function from the image processing apparatus, to start up the electronic mail transmitting function and cause a predetermined display unit to display address information managed using the electronic mail transmitting function; a transmission destination designation information transmitting unit configured to receive an operation of designating a transmission destination address among the address information displayed by the display unit and transmit transmission destination designation information representing that a transmission destination address is designated to the image processing apparatus; and an attached file output unit configured to output image data as an attached file of an electronic mail generated using the electronic mail transmitting function in a case where the image data is received from the image processing apparatus.

BRIEF DESCRIPTION OF THE DRAWINGS

The above advantages and features of one or more embodiments of the invention will become more fully understood from the detailed description given hereinbelow and the appended drawings which are given by way of illustration only, and thus are not intended as a definition of the limits of the present invention, and wherein:

FIG. 8 is a diagram that illustrates an example of an address selection screen on which a job execution button is enabled;

FIG. 9 is a diagram that illustrates an example of history information;

FIG. 10 is a flowchart that illustrates an example of the process sequence performed by a mobile terminal.

DESCRIPTION OF EMBODIMENTS

Figure 1:
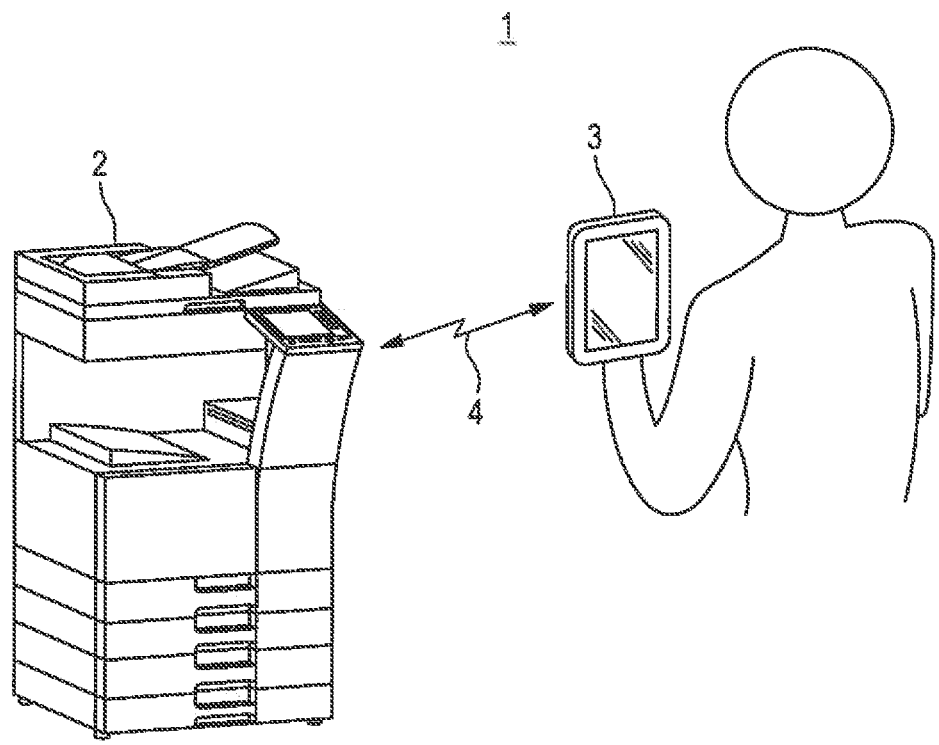
FIG. 1 is a diagram that illustrates an example of the configuration of an image processing system.

Hereinafter, embodiments of the present invention will be described in detail with reference to the drawings. However, the scope of the invention is not limited to the illustrated examples. A same reference numeral is assigned to each member that is common to embodiments described below, and duplicate description thereof will not be presented.

FIG. 1 is a diagram that illustrates an example of the configuration of an image processing system 1 according to one or more embodiments. This image processing system 1 is configured to include: an image processing apparatus 2 configured by an MFP or the like; and a mobile terminal 3 configured by a smartphone, a tablet terminal, or the like. The image processing apparatus 2, for example, is an apparatus that is installed at an office or the like and is used by a plurality of users in a shared manner. The mobile terminal 3 is a user-dedicated device used by one user. The image processing system 1 is configured such that the image processing apparatus 2 and the mobile terminal 3 can communicate with each other. The form of the communication between the image processing apparatus 2 and the mobile terminal 3 may be either wired communication or wireless communication. In one or more embodiments, a case will be described in which the image processing apparatus 2 and the mobile terminal 3 perform wireless communication such as Bluetooth (registered trademark), WiFi, or NFC (Near Field Communication). For example, the image processing apparatus 2, as will be described later, has a wireless communication interface that is a base station of wireless communication built therein and, when a mobile terminal 3 possessed by a user is detected within a range of a predetermined distance, establishes a communicable state by pairing with the mobile terminal 3. The number of mobile terminals 3 with which the image processing apparatus 2 can communicate may be one, or the image processing apparatus 2 may be communicable with a plurality of mobile terminals 3 at the same time.

The image processing apparatus 2 has a plurality of functions such as a scanning function, a print function, a network function, a FAX function, an electronic mail transmitting function, and a BOX function. Particularly, the image processing apparatus 2 has an image data transmitting function for transmitting image data generated by reading an image of a document using a scanning function, image data stored using the BOX function, image data acquired through a network, or the like to the outside through an electronic mail, FAX, or the like. In the image processing apparatus 2, a program used for an operation linked with the mobile terminal 3 is stored in advance.

On the other hand, in the mobile terminal 3, in addition to a wireless communication function for performing wireless communication with the image processing apparatus 2, an electronic mail transmitting function for transmitting an electronic mail is mounted in advance. For this reason, in the mobile terminal 3, address information that is registered by a user in advance for transmitting the electronic mail is stored. In addition, in the mobile terminal 3, a link program used of an operation linked with the image processing apparatus 2 is stored in advance. The mobile terminal 3 can perform a process linked with the image processing apparatus 2 by starting up a link application by executing the link program. Such a link application may be started up in a case where a user gives an instruction for executing the link program, or it may be configured such that the link program is automatically executed as power is input to the mobile terminal 3, and thereafter, the link application resides in the mobile terminal 3 in a started-up state.

In the image processing system 1 as described above, when a user possessing the mobile terminal 3 in which the link application is started up comes closer to the image processing apparatus 2 and enters a range in which the mobile terminal 3 and the image processing apparatus 2 can wirelessly communicate with each other, a state is formed in which the image processing apparatus 2 and the mobile terminal 3 can communicate with each other, and processes for a linking operation are started in the image processing apparatus 2 and the mobile terminal 3. Particularly, in one or more embodiments, in a case where a user possessing the mobile terminal 3 selects the image data transmitting function for transmitting image data to the outside by operating the image processing apparatus 2, the image processing apparatus 2 and the mobile terminal 3 start an automatic link and automatically progress various processes, whereby a user's operation burden is configured to be reduced. Hereinafter, such an image processing system 1 will be described in detail.

Figure 2:
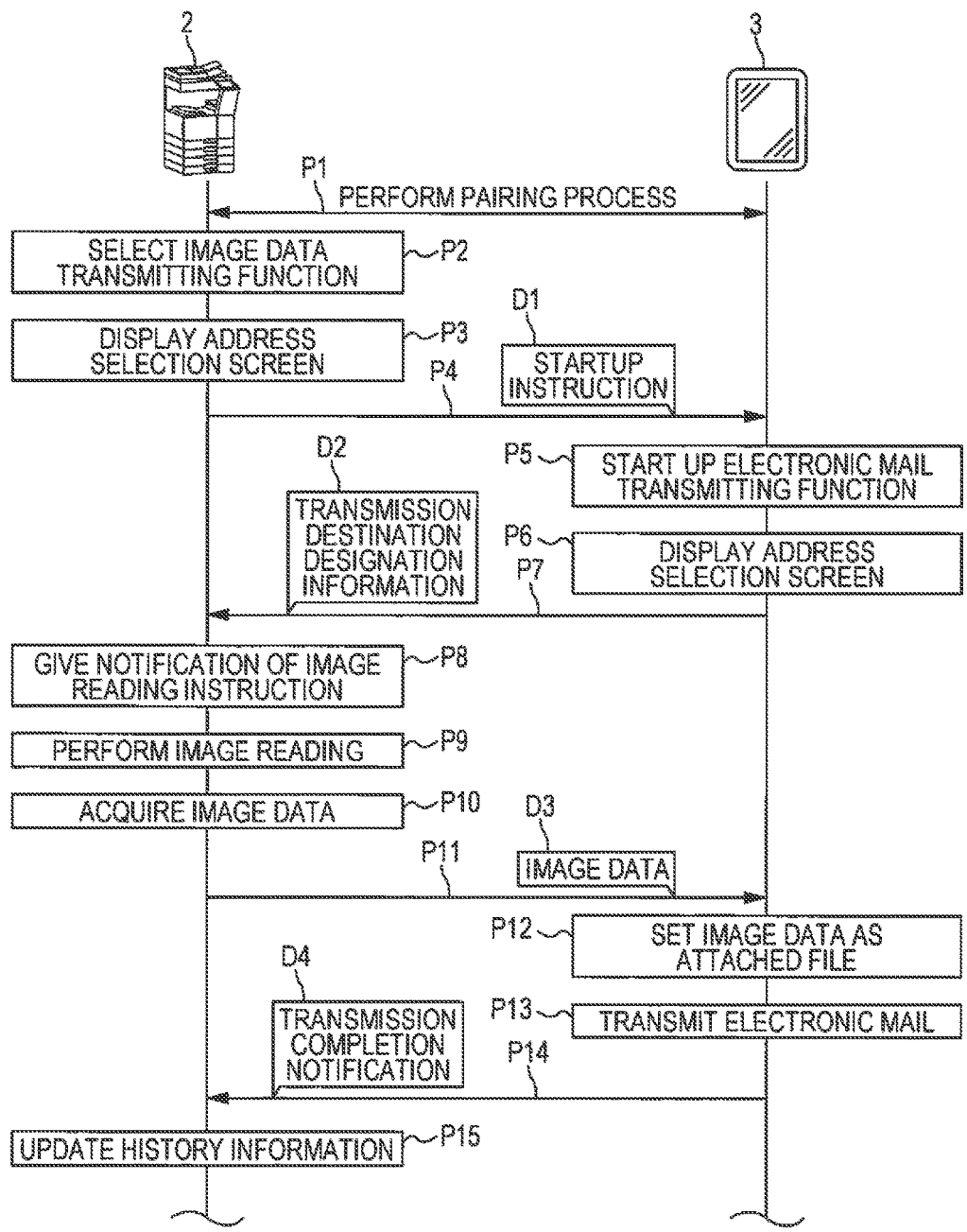
FIG. 2 is a diagram that illustrates the flow of each process of a linking operation between an image processing apparatus and a mobile terminal.

FIG. 2 is a diagram that illustrates the flow of each process of a linking operation between the image processing apparatus 2 and the mobile terminal 3. FIG. 2 illustrates the flow of a process performed in a case where a user performs an operation of selecting the image data transmitting function for transmitting image data generated by reading an image of a document using the scanning function by operating the image processing apparatus 2 to the outside.

First, when a mobile terminal 3 of a state in which the link application is started up is detected within a wirelessly communicable range, the image processing apparatus 2 performs a process of pairing with the mobile terminal 3 and establishes a state communicable with the mobile terminal 3 (Process P1). Thereafter, when a user performs login for the image processing apparatus 2 and selects the image data transmitting function by operating the image processing apparatus 2 (Process P2), the image processing apparatus 2 displays an address selection screen based on address registration information registered in the image processing apparatus 2 in advance as a transmission destination of image data (Process P3). In addition, the image processing apparatus 2, accompanying the display of the address selection screen, transmits a startup instruction D1 used for starting up the electronic mail transmitting function to the mobile terminal 3 possessed by the user (Process P4).

When the mobile terminal 3 receives the startup instruction D1 from the image processing apparatus 2, the startup instruction D1 is processed by the link application. In other words, the link application starts up the electronic mail transmitting function of the mobile terminal 3 based on the startup instruction D1 supplied from the image processing apparatus 2 (Process P5). Then, the link application displays address information managed using the electronic mail transmitting function on the mobile terminal 3. Accordingly, in the mobile terminal 3, for example, an address selection screen on which a plurality of electronic mail addresses are displayed as a list is displayed (Process P6). Thereafter, when a transmission destination address of image data is designated by the user, the link application transmits transmission destination designation information D2 representing that a transmission destination address is designated in the mobile terminal 3 to the image processing apparatus 2 (Process P7).

When the transmission destination designation information D2 is received from the mobile terminal 3, the image processing apparatus 2 permits the execution of a job and forms a state in which a document reading operation using the scanning function can be performed also in a case where an address selecting operation for the address selection screen displayed on the image processing apparatus 2 is not performed. Then, when user's image read instruction is detected (Process P8), the image processing apparatus 2 starts an operation of reading an image of a document (process P9) and acquires image data that is a transmission target (process P10). Thereafter, the image processing apparatus 2 automatically converts the image data generated by reading the image of the document into a predetermined data format such as a PDF (Portable Document Format) that can be handled by the mobile terminal 3 and transmits image data D3 of the predetermined data format to the mobile terminal 3 (Process P11).

When the mobile terminal 3 receives the image data D3 from the image processing apparatus 2, first, the link application acquires the image data D3. Then, the link application sets the image data D3 as an attached file to be attached to an electronic mail and outputs the image data D3 to the electronic mail transmitting function (Process P12). In this way, the electronic mail transmitting function generates an electronic mail in which the image data D3 output from the link application is automatically set as an attached file. Then, the mobile terminal 3 transmits an electronic mail to a transmission destination address designated by the user (Process P13). At this time, the transmitted electronic mail is an electronic mail in which an individual user's electronic mail address is recorded in the field of a transmission source address. For this reason, a recipient of an electronic mail transmitted from the mobile terminal 3 can easily check a source person of the mail by checking the field of the transmission source address of the received mail.

The timing at which the mobile terminal 3 transmits an electronic mail to which the image data D3 is attached to a transmission destination address designated by the user is arbitrary. For example, the electronic mail may be configured to be automatically transmitted after the image data D3 is set as an attached file or may be transmitted after a user's transmission instruction is detected. In a case where an electronic mail is configured to be transmitted after a user's transmission instruction is detected, since there is spare time for the user to input a title, a text, and the like to the automatically-generated electronic mail through a manual operation, the electronic mail can be transmitted with a content desired by the user.

Then, when the process of transmission of the electronic mail to which the image data D3 acquired from the image processing apparatus 2 is attached is completed, the mobile terminal 3 transmits a transmission completion notification D4 to the image processing apparatus 2 (Process P14). When the transmission completion notification D4 is received, the image processing apparatus 2 updates history information in which a job execution history is recorded (Process P15). At this time, the image processing apparatus 2 records information representing that the image data D3 has been transmitted through the mobile terminal 3 in the history information. In this way, since the mobile terminal 3 through which the image data D3 has been transmitted can be specified by referring to the history information, detailed information can be managed by using the history information.

As the process described above automatically progresses between the image processing apparatus 2 and the mobile terminal 3, a user does not need to manually perform an operation of converting the image data generated by reading an image of a document into image data of a data format that can be handled by the mobile terminal, an operation for fetching the image data into the mobile terminal, and the like. In addition, in the mobile terminal 3, an electronic mail transmitting function such as a mailer is automatically started up, and the image data D3 acquired from the image processing apparatus 2 is automatically set as an attached file of an electronic mail, and accordingly, the user does not need to individually perform such operations. Therefore, the user's operation burden is reduced, and a linking operation having superior convenience is realized.

When the startup instruction D1 is transmitted to the mobile terminal 3, the image processing apparatus 2 displays an address selection screen based on the address registration information that is also registered in the image processing apparatus 2 in advance. For this reason, the user can perform an operation of selecting a transmission destination address not only on the address selection screen displayed by the mobile terminal 3 but also on the address selection screen displayed by the image processing apparatus 2. In such a case, there are also cases where a transmission destination address designated as the user operates the mobile terminal 3 and a transmission destination address designated by operating the image processing apparatus 2 overlap each other. For this reason, in a case where transmission destination addresses are designated by both the image processing apparatus 2 and the mobile terminal 3, the image processing apparatus 2 determines whether or not the transmission destination addresses designated by the image processing apparatus 2 and the mobile terminal 3 are the same, and, in case of the same address, an indication thereof is configured to be notified to the user for a warning.

Furthermore, in a case where transmission destination addresses are designated by both the image processing apparatus 2 and the mobile terminal 3, when the user manually inputs a title, a text, and the like of an electronic mail by operating the mobile terminal 3, the image processing apparatus 2 is configured to acquire mail information such as the title, the text, and the like from the mobile terminal 3 and automatically assign the title, the text, and the like to the electronic mail that is automatically generated by the image processing apparatus 2 based on the mail information. In this way, the user does not need to manually input information such as a title, a text, and the like to each of the mobile terminal 3 and the image processing apparatus 2, and accordingly, superior convenience is achieved in a case where an electronic mail to which image data is attached is transmitted to the outside from both the image processing apparatus 2 and the mobile terminal 3.

Figure 3:
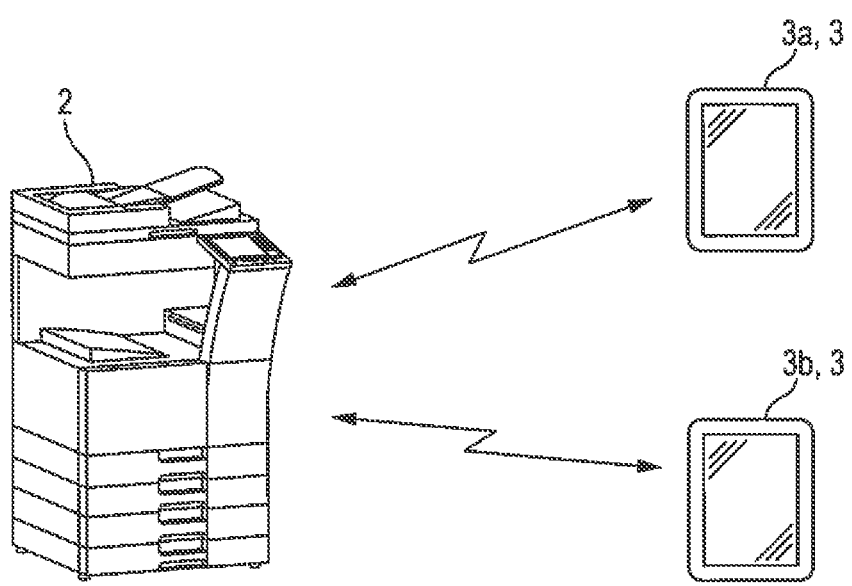
FIG. 3 is a diagram that illustrates an example in which an image processing apparatus has established communication states with a plurality of mobile terminals.

FIG. 3 is a diagram that illustrates an example in which an image processing apparatus 2 has established communication states with a plurality of mobile terminals 3a and 3b. As illustrated in FIG. 3, in a case where a user possesses the plurality of mobile terminals 3a and 3b, the image processing apparatus 2 can simultaneously establish communication states with the plurality of mobile terminals 3a and 3b. In such a case, address information registered in one mobile terminal 3a and address information registered in the other mobile terminal 3b do not necessarily need to completely match each other, and there are cases where an address registered only in one mobile terminal 3a, and an address registered only in the other mobile terminal 3b, or the like is present. In such cases, when the image data transmitting function is selected by the user, the image processing apparatus 2 transmits a startup instruction D1 used for starting up the electronic mail transmitting function to each of the plurality of mobile terminals 3a and 3b and automatically displays an address selection screen in each of the plurality of mobile terminals 3a and 3b. For this reason, the user can individually select a transmission destination address from the address selection screen that is automatically displayed in each of the plurality of mobile terminals 3a and 3b.

Then, in a case where the user performs an operation of selecting a transmission destination address for each of the plurality of mobile terminals 3a and 3b, the image processing apparatus 2 receives transmission destination designation information D2 from each of the mobile terminals 3a and 3b and thus, can perceive that a transmission destination address is designated in each of the mobile terminals 3a and 3b. For this reason, the image processing apparatus 2 transmits image data D3 that is a transmission target to each of the plurality of the mobile terminals 3a and 3b. At this time, the image processing apparatus 2, similar to the description presented above, determines whether or not the transmission destination address designated by the user operating the mobile terminal 3a and the transmission destination address designated by operating the mobile terminal 3b overlap each other, and, in case of overlapping addresses, notifies an indication thereof to the user for a warning.

In addition, in a case where the user manually inputs a title, a text, and the like of an electronic mail by operating one mobile terminal 3a, the image processing apparatus 2 acquires mail information such as the title, the text, and the like from one mobile terminal 3a and transmits the mail information to the other mobile terminal 3b. Then, the other mobile terminal 3b automatically assigns the title, the text, and the like to an electronic mail that is automatically generated by the other mobile terminal 3b based on the mail information acquired through the image processing apparatus 2. In this way, since the user does not need to manually input information such as a title, a text, and the like to each of the plurality of mobile terminals 3a and 3b, superior convenience is achieved in a case where electronic mails to which image data is attached are transmitted from the plurality of mobile terminals 3a and 3b to the outside.

Next, specific configurations and operations of the image processing apparatus 2 and the mobile terminal 3 of the image processing system 1 will be described in detail.

Figure 4:
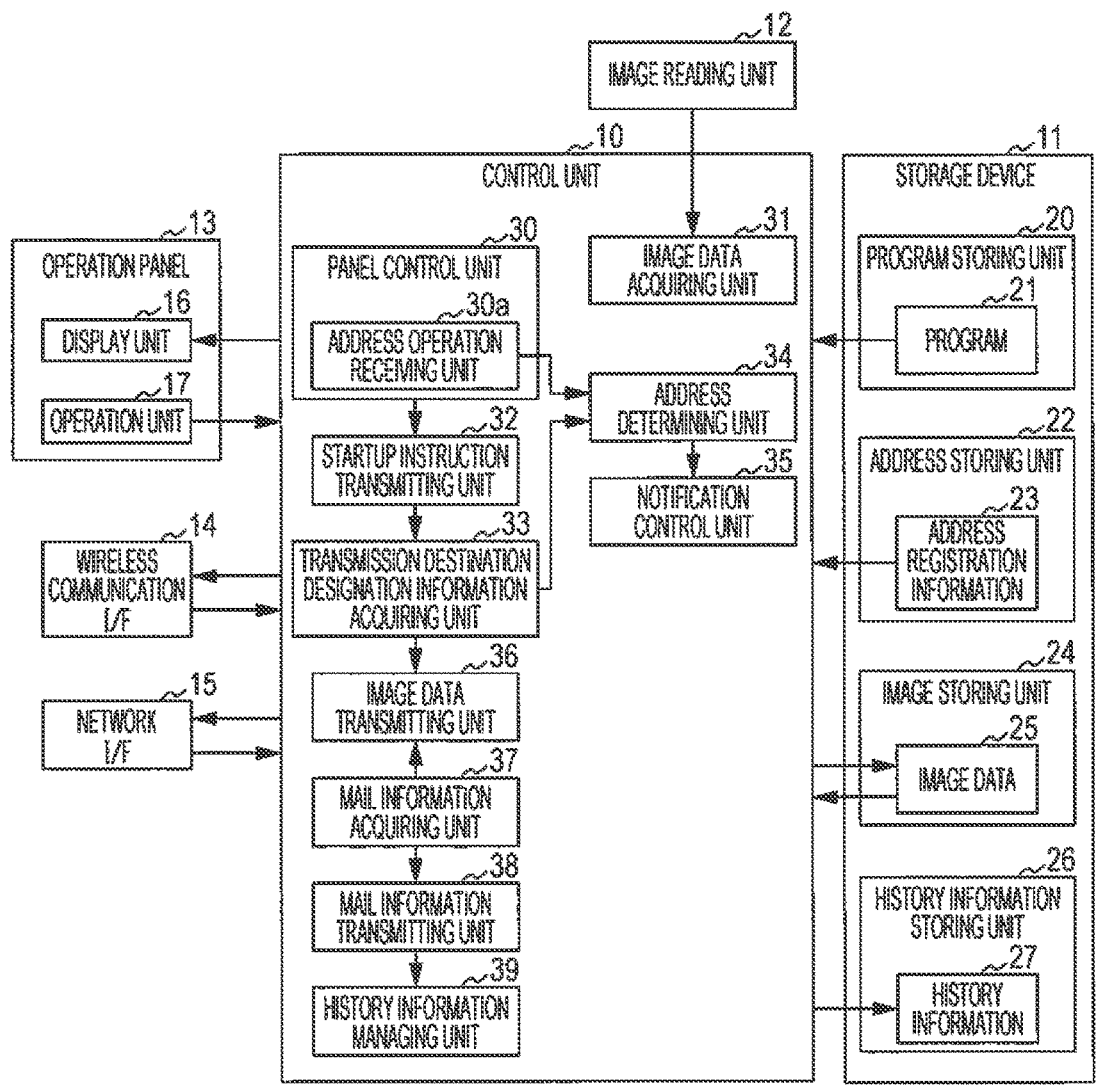
FIG. 4 is a block diagram that illustrates an example of the hardware configuration and the functional configuration of an image processing apparatus.

First, the configuration of the image processing apparatus 2 will be described. FIG. 4 is a block diagram that illustrates an example of the hardware configuration and the functional configuration of the image processing apparatus 2. As illustrated in FIG. 4, the image processing apparatus 2, as the hardware configuration, includes: a control unit (or "controller") 10 that is configured to include a CPU and a memory; a nonvolatile storage device 11 that is configured by a hard disk drive (HDD), a semiconductor memory, or the like; an image reading unit 12 that generates image data by optically reading an image of a document; an operation panel 13 that serves as a user interface when a user operates the image processing apparatus 2; a wireless communication interface 14 that is used for wirelessly communicating with the mobile terminal 3; and a network interface 15 that is used for connecting the image processing apparatus 2 to a network such as a LAN (Local Area Network). In addition, while the image processing apparatus 2 includes a printer unit used for performing printing output, a FAX unit used for transmitting/receiving FAX data, and the like, those are not illustrated in the drawing.

The wireless communication interface 14 is an interface wirelessly communicating with the mobile terminal 3. For example, the wireless communication interface 14 emits electric waves in a predetermined range of the periphery of the image processing apparatus 2, and, in a case where the presence of a mobile terminal 3 within the predetermined range is detected, can automatically establish a wirelessly communicable connection state by performing the process of pairing with the mobile terminal 3. The number of mobile terminals 3 with which the wireless communication interface 14 wirelessly communicates may be one or two or more.

The operation panel 13 includes: a display unit 16 that displays various kinds of information; and an operation unit 17 that receives a user's input operation. The display unit 16, for example, is configured by a color liquid crystal display or the like and can display various screens including the address selection screen described above. The operation unit 17, for example, is configured by a touch panel sensor or the like arranged on the screen of the display unit 16 and can detect various operations including a user's touch operation for the screen.

In the storage device 11, a program storing unit 20, an address storing unit 22, an image storing unit 24, and a history information storing unit 26 are arranged. The program storing unit 20 is a storage area used for storing a program 21 executed by the CPU of the control unit 10. The address storing unit 22 is a storage area that is used for storing address registration information 23 in which an address that is a transmission destination at the time of transmitting an electronic mail or FAX using the image data transmitting function is registered in advance. The image storing unit 24 is a storage area used for temporarily storing the image data 25 acquired as a transmission target of the image data transmitting function. The history information storing unit 26 is a storage area used for storing history information 27 in which a job execution history of the image processing apparatus 2 is recorded. In addition, in the storage device 11, a BOX storing area used for storing image data, document data, and the like managed by the BOX function and the like are arranged.

When power is input to the image processing apparatus 2, the CPU of the control unit 10, by reading the program 21 from the program storing unit 20 and executing the program, functions as various processing units and controls the operation of each unit. Particularly, as in one or more embodiments, in order for the image processing apparatus 2 to operate the image data transmitting function, as illustrated in FIG. 4, the control unit 10 functions as a panel control unit 30, an image data acquiring unit 31, a startup instruction transmitting unit 32, a transmission destination designation information acquiring unit 33, an address determining unit 34, a notification control unit 35, an image data transmitting unit 36, a mail information acquiring unit 37, a mail information transmitting unit 38, and a history information managing unit 39.

The panel control unit 30 displays an operation screen for which a user can operate on the display unit 16 of the operation panel 13 and, in a case where the operation unit 17 detects a user's operation, acquires operation information based on the operation and performs a process corresponding to the operation information. For example, when the address selection screen is displayed on the display unit 16, the panel control unit 30 reads the address registration information 23 from the address storing unit 22 and displays a list of addresses registered in the address registration information 23 on the address selection screen. In addition, the panel control unit 30 includes an address operation receiving unit 30a. The address operation receiving unit 30a functions when the address selection screen is displayed on the display unit 16. This address operation receiving unit 30a specifies a transmission destination address designated by the user on the operation panel 13 based on a user's operation performed for the address selection screen. Then, the address operation receiving unit 30a outputs an electronic mail address designated by the user as a transmission destination address to the address determining unit 34.

The image data acquiring unit 31 acquires image data 25 that is a transmission target using the image data transmitting function. For example, in case of scanning transmission for transmitting image data generated by reading an image of a document to the outside, the image data acquiring unit 31 acquires image data output from the image reading unit 12 as the image data 25 that is a transmission target. However, the acquisition of image data is not limited thereto, but the image data acquiring unit 31 may acquire the image data 25 that is a transmission target through the network interface 15, or image data, document data, or the like managed by the BOX function may be acquired as the image data 25 that is a transmission target. Then, the image data acquiring unit 31 temporarily stores the image data 25 acquired as the transmission target in the image storing unit 24. Here, the image storing unit 24 may be arranged in a dedicated image memory other than the storage device 11.

The startup instruction transmitting unit 32, in a case where at least one mobile terminal 3 that is wirelessly connected is present at a time point when the image data transmitting function is selected by the user, is a processing unit that transmits the startup instruction D1 used for starting up the electronic mail transmitting function to the mobile terminal 3. In the startup instruction D1 transmitted at this time, not only an instruction used for automatically starting up the electronic mail transmitting function in the mobile terminal 3 but also an instruction used for automatically displaying the address selection screen based on the address information managed by the mobile terminal 3 is included. Accordingly, by receiving this startup instruction D1, the mobile terminal 3 automatically performs the process of starting up the electronic mail transmitting function and the process of displaying the address selection screen as a series of processes.

After the startup instruction D1 is transmitted by the startup instruction transmitting unit 32 to the mobile terminal 3, the transmission destination designation information acquiring unit 33 acquires transmission destination designation information D2 representing that the transmission destination address of the image data 25 acquired by the image data acquiring unit 31 is designated from the mobile terminal. In the transmission destination designation information D2 transmitted from the mobile terminal 3, information relating to an electronic mail address designated as the transmission destination in the mobile terminal 3 is included. For this reason, when the transmission destination designation information D2 is acquired, the transmission destination designation information acquiring unit 33 extracts an electronic mail address from the transmission destination designation information D2 and outputs the electronic mail address to the address determining unit 34. In a case where the transmission destination designation information D2 is acquired from a plurality of mobile terminals 3, the transmission destination designation information acquiring unit 33 extracts an electronic mail address from each of the plurality of pieces of transmission destination designation information D2 and outputs the extracted electronic mail addresses to the address determining unit 34.

The address determining unit 34 determines whether or not the same address is included in the electronic mail addresses output from the address operation receiving unit 30a and the transmission destination designation information acquiring unit 33. As a result, in a case where the same address is included, the address determining unit 34 causes the notification control unit 35 to function. On the other hand, in a case where the same address is not included, the determination process ends without causing the notification control unit 35 to function.

The notification control unit 35 is a processing unit that, in a case where the same address is included in a plurality of transmission destination addresses designated by the user, notifies the user of an indication thereof and warns overlapping designation of the transmission destination addresses. This notification control unit 35 notifies the user of overlapping of the transmission destination addresses, for example, by displaying a warning on the display unit 16 through the panel control unit 30. In addition, the notification control unit 35 may cause the mobile terminal 3 to perform a warning display by transmitting a notification instruction to the mobile terminal 3. In this way, the user can recognize that the transmission destination addresses individually selected by the image processing apparatus 2 and the mobile terminal 3 overlap each other and thus, can perform an operation of releasing overlapping designation in a speedy manner.

In a case where the user designates a transmission destination address by operating only one of the operation panel 13 and the mobile terminal 3, there is no overlapping between transmission destination addresses, and accordingly, the address determining unit 34 and the notification control unit 35 may be configured not to function.

The image data transmitting unit 36 is a processing unit that performs the process of transmitting image data D3 that is a transmission target. This image data transmitting unit 36, in a case where the transmission destination designation information D2 is acquired by the transmission destination designation information acquiring unit 33 from a mobile terminal 3, transmits image data to the mobile terminal 3. At this time, the image data transmitting unit 36 reads image data 25 that is acquired by the image data acquiring unit 31 and is stored in the image storing unit 24 and converts the data format of the image data 25 into a data format such as the PDF that can be processed by the mobile terminal 3, thereby generating image data D3 that can be processed by the mobile terminal 3. In addition, in a case where the image size of the image data 25 stored in the image storing unit 24 is an image size of a large capacity exceeding a predetermined size, the image data transmitting unit 36 reads the image data 25 stored in the image storing unit 24 and reduces the image size of the image data 25 and generates image data D3 that can be processed also by a mobile terminal 3 of a small size such as a smartphone. Then, the image data transmitting unit 36 transmits the image data D3 generated as described above to the mobile terminal 3.

In a case where the transmission destination address designated by the user is received by the address operation receiving unit 30a, the image data transmitting unit 36 automatically generates an electronic mail to be transmitted to the transmission destination address specified by the address operation receiving unit 30a and attaches image data 25 read from the image storing unit 24 to the electronic mail as an attached file. Then, the image data transmitting unit 36 transmits the electronic mail to which the image data 25 is attached to the transmission destination address designated by the user.

The timing at which the image data transmitting unit 36 transmits the electronic mail is arbitrary. For example, after the image data 25 is attached to the electronic mail, the electronic mail may be configured to be automatically transmitted in a speedy manner, or, after a user's transmission instruction is detected, the electronic mail may be configured to be transmitted.

However, in a case where, after the image data 25 is attached to an electronic mail, the electronic mail is automatically transmitted in a speedy manner, there is a possibility that an electronic mail in which a title, a text, and the like of the electronic mail are vacant is transmitted. For this reason, after an electronic mail to which the image data 25 is attached is generated, without performing automatic transmission until a predetermined time elapses, the image data transmitting unit 36 sets automatic transmission to be in a standby state until the mail information acquiring unit 37 acquires mail information including information such as a title, a text, and the like from the mobile terminal 3. In such a case, when the mail information is acquired from the mobile terminal 3 by the mail information acquiring unit 37, the image data transmitting unit 36 completes the electronic mail by copying the title and the text included in the mail information into a title field and a text field of the electronic mail and can transmit the completed electronic mail to the transmission destination address.

The mail information acquiring unit 37 is a processing unit that acquires the mail information including information of a title, a text, and the like that are manually input by the user to the electronic mail generated by the mobile terminal 3 from the mobile terminal 3. When the mail information is acquired, the mail information acquiring unit 37 outputs the mail information to the image data transmitting unit 36. For this reason, the image data transmitting unit 36, as described above, can reflect information generated by the user on the title field and the text field of an electronic mail transmitted from the image processing apparatus 2.

In addition, in a case where the image processing apparatus 2 establishes communication states with a plurality of mobile terminals 3a and 3b, when the mail information is acquired from one mobile terminal 3a, the mail information acquiring unit 37 outputs the mail information to the mail information transmitting unit 38.

The mail information transmitting unit 38 is a processing unit that transmits the mail information acquired from one mobile terminal 3a by the mail information acquiring unit 37 to the other mobile terminal 3b through the wireless communication interface 14. As the mail information transmitting unit 38 transmits the mail information acquired from one mobile terminal 3a to the other mobile terminal 3b, the other mobile terminal 3b can reflects information generated by the user on the title field and the text field of an electronic mail transmitted from the other mobile terminal 3b based on the mail information. Accordingly, the user's operation burden can be reduced. In other words, in a case where the user manually inputs the title and the text of an electronic mail by operating one mobile terminal 3a, the same operation does not need to be performed for the other mobile terminal 3b, and accordingly, the operation burden is reduced.

The history information managing unit 39 manages the history information 27 stored in the history information storing unit 26 and records necessary information in the history information 27 accompanying the execution of a job, thereby updating the history information 27. For example, when an electronic mail is transmitted by the image data transmitting unit 36, the history information managing unit 39 records a result of the transmission in the history information 27. In addition, when a transmission completion notification is received from the mobile terminal 3, the history information managing unit 39 records the result of the transmission in the history information 27. At this time, the history information managing unit 39 records information representing the transmission of image data through the mobile terminal 3 in the history information 27 together with identification information that can be used for identifying the mobile terminal 3 that has transmitted the electronic mail. In this way, by referring to the history information 27, a mobile terminal 3 through which the image data has been transmitted can be specified, and details of a job can be acquired.

Figure 5:
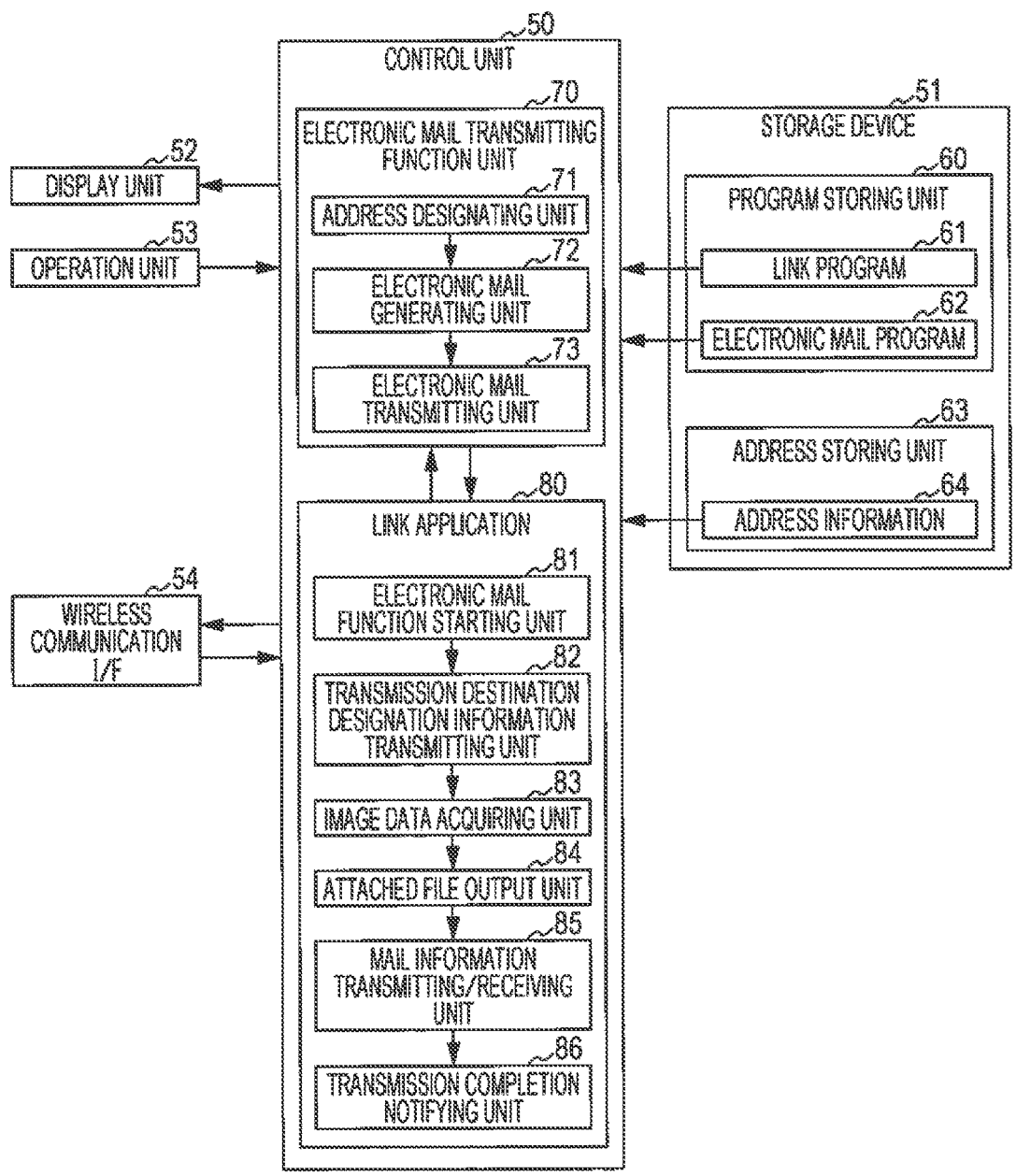
FIG. 5 is a block diagram that illustrates an example of the hardware configuration and the functional configuration of a mobile terminal.

Next, the configuration of the mobile terminal 3 will be described. FIG. 5 is a block diagram that illustrates an example of the hardware configuration and the functional configuration of the mobile terminal 3. As illustrated in FIG. 5, the mobile terminal 3, as the hardware configuration, includes: a control unit 50 that is configured to include a CPU and a memory; a nonvolatile storage device 51 that is configured by a solid state drive (SSD) or the like; a display unit 52 that is configured by a color liquid crystal display or the like; an operation unit 53 that is configured by a touch panel sensor or the like arranged on the screen of the display unit 52; and a wireless communication interface 54.

The wireless communication interface 54 is an interface wirelessly communicating with the image processing apparatus 2. For example, when an electric wave emitted from the image processing apparatus 2 is detected, the wireless communication interface 54 automatically establishes a wirelessly communicable state by performing the process of pairing with the image processing apparatus 2. The number of image processing apparatuses 2 with which the wireless communication interface 54 wirelessly communicates is one.

In the storage device 51, a program storing unit 60 and an address storing unit 63 are arranged. The program storing unit 60 is a storage area used for storing various programs executed by the CPU of the control unit 50. For example, a link program 61 used for performing an operation linked with the image processing apparatus 2 and an electronic mail program 62 used for operating the electronic mail transmitting function are stored in advance. While not illustrated in the drawing, in the program storing unit 60, an operating system that is a basic program of the mobile terminal 3 is also stored. The address storing unit 63 is a storage area used for storing address information 64 in which an electronic mail address registered in advance by the user is recorded.

The CPU of the control unit 50, by reading various programs from the program storing unit 60 and executing the program, functions as various processing units and controls the operation of each unit. For example, as power is input to the mobile terminal 3, the control unit 50 starts up the operating system. In this way, the CPU of the control unit 50 is in a state in which the link program 61 and the electronic mail program 62 can be executed. Then, in one or more embodiments, as the CPU executes the link program 61, the control unit 50 functions as a link application 80. In addition, as the CPU executes the electronic mail program 62, the control unit 50 functions as an electronic mail transmitting function unit 70. The link application 80 and the electronic mail transmitting function unit 70 can be simultaneously started up in the control unit 50 and can perform an operation linked with each other. For example, as the link application 80 outputs a command to the electronic mail transmitting function unit 70, the electronic mail transmitting function unit 70 performs a process corresponding to the command and performs a response process for the link application 80 as is necessary.

The mobile terminal 3 establishes a state communicable with the image processing apparatus 2 in a state in which the link application 80 is started up in the control unit 50. The link application 80 includes: an electronic mail function starting unit 81; a transmission destination designation information transmitting unit 82; an image data acquiring unit 83; an attached file output unit 84; a mail information transmitting/receiving unit 85; and a transmission completion notifying unit 86. On the other hand, the electronic mail transmitting function unit 70 includes: an address designating unit 71; an electronic mail generating unit 72; and an electronic mail transmitting unit 73.

The electronic mail function starting unit 81 functions as a startup instruction D1 of the electronic mail transmitting function is received from the image processing apparatus 2 and instructs the operating system to execute the electronic mail program 62. Accordingly, the operating system reads and executes the electronic mail program 62, and the electronic mail transmitting function unit 70 is automatically started up in the control unit 50. When the electronic mail transmitting function unit 70 is started up in the control unit 50, the electronic mail function starting unit 81 instructs the electronic mail transmitting function unit 70 to display an address selection screen.

When a display instruction of the address selection screen is received from the link application 80, the electronic mail transmitting function unit 70 causes the address designating unit 71 to function. Then, the address designating unit 71 reads the address information 64 from the address storing unit 63 and automatically displays an address selection screen including a list of addresses registered in the address information 64 on the display unit 52. Thereafter, the address designating unit 71 detects a user's operation through the operation unit 53 and outputs a transmission destination address to the electronic mail generating unit 72 when at least one electronic mail address is designated as the transmission destination address by the user. In addition, the address designating unit 71 outputs the transmission destination address designated by the user as a response process of the link application 80.

The electronic mail generating unit 72 is a processing unit that automatically generates an electronic mail in which the transmission destination address designated by the user is set in the destination field. When an electronic mail is automatically generated by the electronic mail generating unit 72, a mail editing screen on which the electronic mail can be edited is displayed by the display unit 52. Accordingly, by operating the mail editing screen, the user can input a desired text of the title or the text.

On the other hand, when the transmission destination address is acquired from the electronic mail transmitting function unit 70, the link application 80 causes the transmission destination designation information transmitting unit 82 to function. The transmission destination designation information transmitting unit 82 is a processing unit that generates transmission destination designation information D2 including the transmission destination address acquired from the electronic mail transmitting function unit 70 and transmits the transmission destination designation information D2 to the image processing apparatus 2. Accordingly, when the user performs an operation of designating a transmission destination address by operating the mobile terminal 3, the transmission destination designation information D2 including the transmission destination address is automatically transmitted from the mobile terminal 3 to the image processing apparatus 2.

The image data acquiring unit 83 is a processing unit that functions after the transmission of the transmission destination designation information D2 and acquires image data D3 transmitted from the image processing apparatus 2. In other words, the image data acquiring unit 83 stands by until the image data D3 is received from the image processing apparatus 2 and receives the image data D3. When the image data D3 is acquired from the image processing apparatus 2, the image data acquiring unit 83 outputs the image data to the attached file output unit 84.

The attached file output unit 84 is a processing unit that designates the image data D3 acquired by the image data acquiring unit 83 as an attached file of an electronic mail and outputs the image data D3 to the electronic mail transmitting function unit 70. As the attached file output unit 84 outputs the image data D3 to the electronic mail transmitting function unit 70 as an attached file, the electronic mail generating unit 72 of the electronic mail transmitting function unit 70 automatically attaches the image data D3 acquired from the link application 80 to the electronic mail that is currently in the middle of an editing operation as an attached file. In addition, the attached file output unit 84 may prohibit the transmission of the electronic mail from the electronic mail transmitting function unit 70 until the image data D3 acquired from the image processing apparatus 2 is output. By configuring as such, erroneous transmission of an electronic mail to which the image data D3 is not attached can be prevented.

The mail information transmitting/receiving unit 85 is a processing unit that transmits/receives mail information such as a title, a text, and the like of an electronic mail to/from the image processing apparatus 2. For example, in a case where a user inputs a title, a text, and the like of an electronic mail that is currently in the middle of an editing operation by operating the operation unit 53, the electronic mail generating unit 72 generates text information of the title, the text, and the like based on the user's operation, reflects the text information on the mail editing screen, and outputs the text information to the link application 80. When the text information is acquired from the electronic mail transmitting function unit 70, the link application 80 causes the mail information transmitting/receiving unit 85 to function. Then, the mail information transmitting/receiving unit 85 generates mail information including the text information acquired from the electronic mail transmitting function unit 70 and transmits the mail information to the image processing apparatus 2.

In addition, there are cases where the mail information transmitting/receiving unit 85 acquires the mail information from the image processing apparatus 2. In such cases, the mail information transmitting/receiving unit 85 outputs the mail information acquired from the image processing apparatus 2 to the electronic mail transmitting function unit 70 together with a command used for giving an instruction for reflecting the mail information on the title, the text, and the like. Accordingly, the electronic mail generating unit 72 automatically inputs the text information to the title field, the text field, and the like of the electronic mail that is currently in the middle of an editing operation based on the mail information acquired from the link application 80. Accordingly, information such as the title, the text, and the like can be shared among a plurality of mobile terminals 3, and the user's operation burden can be reduced.

When the electronic mail is transmitted, the electronic mail transmitting function unit 70 causes the electronic mail transmitting unit 73 to function. The electronic mail transmitting unit 73 transmits an electronic mail to which the image data D3 acquired from the image processing apparatus 2 is attached to a transmission destination address designated by the user. The electronic mail transmitting unit 73 may transmit the electronic mail at predetermined timing or transmit the electronic mail at timing at which a user's transmission instruction is made. Then, when the electronic mail is transmitted, the electronic mail transmitting unit 73 notifies the link application 80 of the completion of the transmission of the electronic mail.

When the notification of the completion of the transmission of the electronic mail is received from the electronic mail transmitting function unit 70, the link application 80 transmits a transmission completion notification D4 to the image processing apparatus 2. Accordingly, the image processing apparatus 2 can check that the image data D3 has been transmitted to the transmission destination address designated by the user from the mobile terminal 3. Then, the history information 27 is updated in the image processing apparatus 2.

Figure 6:
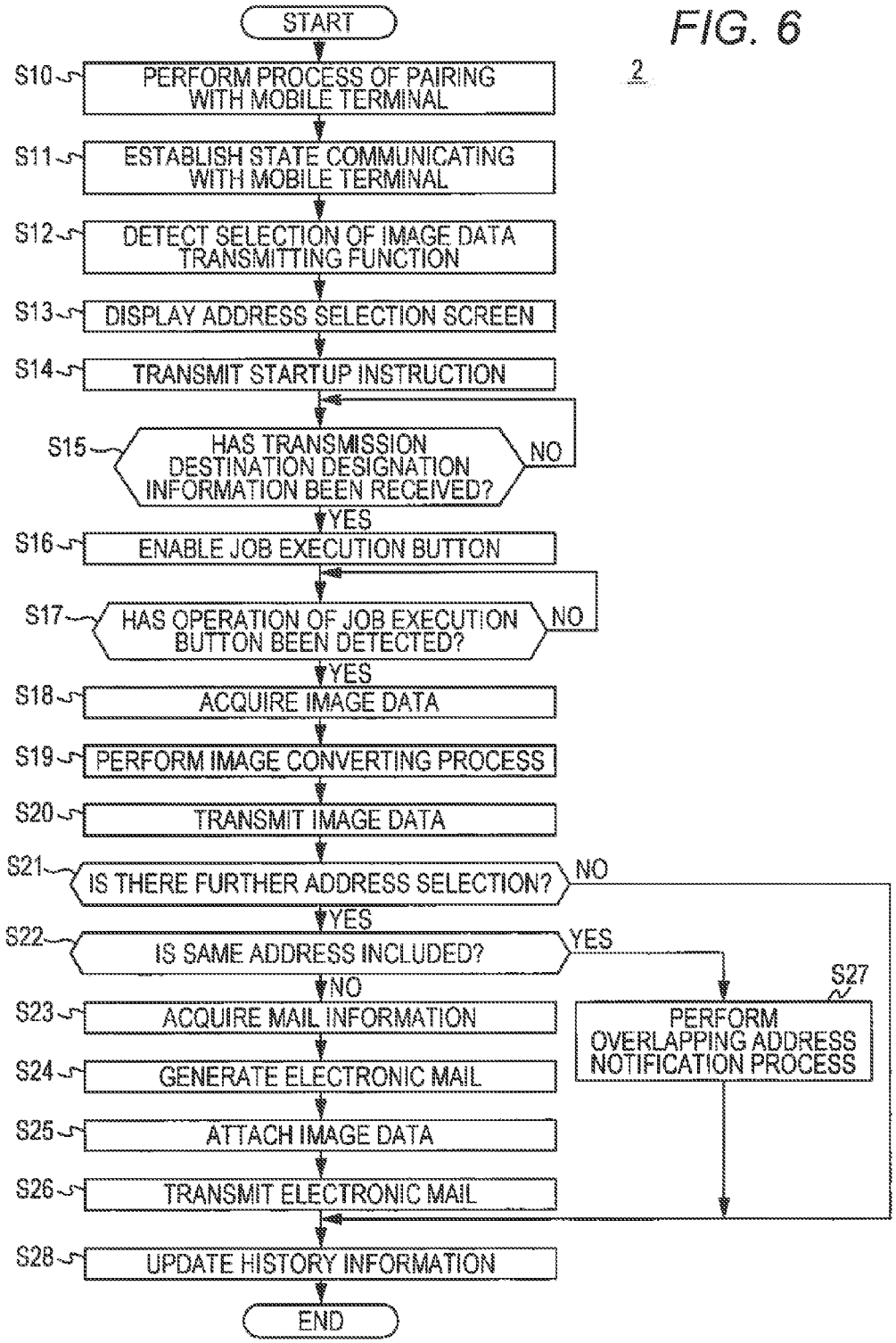
FIG. 6 is a flowchart that illustrates an example of the process sequence performed by an image processing apparatus.

Next, an example of the operation of the image processing apparatus 2 will be described. FIG. 6 is a flowchart that illustrates an example of the process sequence performed by the image processing apparatus 2. This process is a process that is performed based on the program 21. When this process is started, the image processing apparatus 2, first, performs the process of pairing with the mobile terminal 3 (Step S10) and establishes a state communicating with the mobile terminal 3 (Step S11). At this time, the image processing apparatus 2 may establish states communicating with a plurality of mobile terminals 3. Then, when the user's selection of the image data transmitting function by operating the operation panel 13 is detected (Step S12), the image processing apparatus 2 displays an address selection screen that is based on the address registration information 23 on the display unit 16 of the operation panel 13 (Step S13).

Figure 7A:
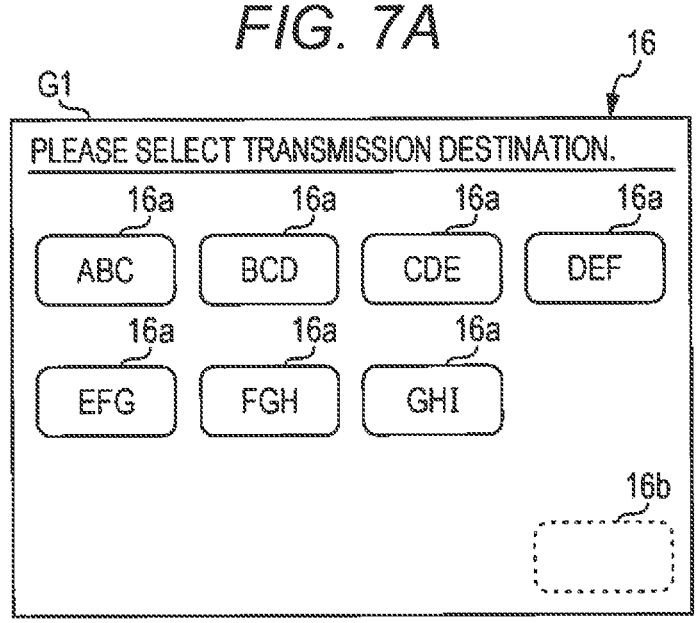
FIGS. 7A and 7B are diagrams that illustrate examples of an address selection screen displayed on a display unit of an operation panel.
Figure 7B:
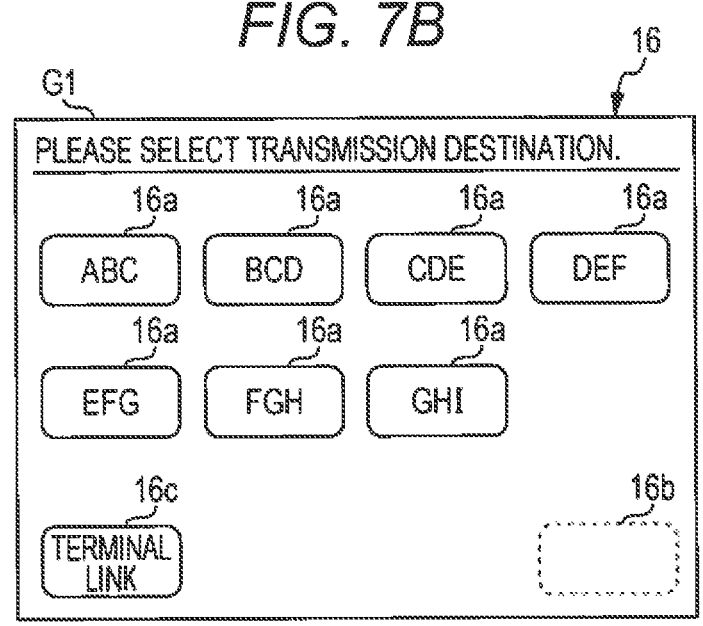

FIGS. 7A and 7B are diagrams that illustrate examples of an address selection screen G1 displayed on the display unit 16 of the operation panel 13. For example, in a case where seven addresses are registered in the address registration information 23, on the display unit 16, as illustrated in FIG. 7A, seven transmission destination designation buttons 16a that can be selected by the user are displayed. All of these seven transmission destination designation buttons 16a are buttons that are used for designating transmission destination addresses. At this time, since the transmission destination address is not designated by the user, a job execution button 16b used for instructing the image processing apparatus 2 to start an image reading operation for a document is in a non-display state or a gray-out display state so as not to be operated by the user.

In addition, on the address selection screen G1, as illustrated in FIG. 7B, a terminal link button 16c used for user's instruction for an operation linked with the mobile terminal 3 may be displayed. In such a case, the image processing apparatus 2 does not automatically start an operation linked with the mobile terminal 3 simultaneously with the display of the address selection screen G1 but can start an operation linked with the mobile terminal 3 that has established a communication state by detecting user's operation of the terminal link button 16c. For this reason, it can be prevented that the electronic mail transmitting function is automatically started up in the mobile terminal 3 although the user has no intention of linking the image processing apparatus 2 and the mobile terminal 3 with each other.

Referring back to the flowchart illustrated in FIG. 6, the image processing apparatus 2, after displaying the address selection screen G1, transmits the startup instruction D1 used for starting up the electronic mail transmitting function to the mobile terminal 3 (Step S14). This startup instruction D1 may be configured to be automatically transmitted or may be configured to be transmitted in a case the user operates the terminal link button 16c as described above. Then, the image processing apparatus 2, after transmitting the startup instruction D1, stands by until the transmission destination designation information D2 is received from the mobile terminal 3 (No in Step S15). When the transmission destination designation information D2 is received (Yes in Step S15), the job execution button 16b disposed on the address selection screen G1 is enabled to be in a user's operable state (Step S16).

FIG. 8 is a diagram that illustrates an example of the address selection screen G1 on which the job execution button 16b is enabled. When the transmission destination designation information D2 is received from the mobile terminal 3, at least one transmission destination address of the image data D3 is designated by the user, and accordingly, the execution of a job is in an executable state in the image processing apparatus 2. For this reason, the image processing apparatus 2, as illustrated in FIG. 8, displays the job execution button 16b in a normal display state, and a state is formed in which user's operation of the job execution button 16b can be received. In addition, the image processing apparatus 2 may be configured to enable the job execution button 16b also in a case where the user performs an operation of selecting a transmission destination address on the address selection screen G1 displayed on the operation panel 13.

Referring back to the flowchart illustrated in FIG. 6, the image processing apparatus 2 stands by until the job execution button 16b is operated by the user (No in Step S17). When the job execution button 16b is operated (Yes in Step S17), the image processing apparatus 2 acquires the image data 25 by performing drive control of the image reading unit 12 (Step S18). Then, the image processing apparatus 2 temporarily stores the image data 25 acquired from the image reading unit 12 in the image storing unit 24. Thereafter, the image processing apparatus 2 performs an image converting process reading the image data 25 stored in the image storing unit 24 and converting the data format or the image size thereof, thereby generating image data D3 that can be handled by the mobile terminal 3 (Step S19). Then, the image processing apparatus 2 transmits the image data D3 to the mobile terminal 3 (Step S20).

Subsequently, the image processing apparatus 2 determines whether or not a transmission destination address is further selected on the address selection screen G1 displayed on the operation panel 13 (Step S21). As a result, in a case where an address selection operation is not performed for the operation panel 13 (No in Step S21), the process proceeds to Step S28. On the other hand, in a case where an address selecting operation for the operation panel 13 is performed (Yes in Step S21), the image processing apparatus 2 determines whether or not there is the same address as the transmission destination address included in the transmission destination designation information D2 received from the mobile terminal 3 among the transmission destination addresses selected on the address selection screen G1 of the operation panel 13 (Step S22). Then, in a case where the same address is included (Yes in Step S22), the image processing apparatus 2 performs a notification process for notifying the user of overlapping of the transmission destination addresses (Step S27). This notification process, for example, is performed by displaying an overlapping address on the display unit 16 of the operation panel 13. The display of an overlapping address is not limited thereto, and, for example, it may be configured such that the image processing apparatus 2 instructs the mobile terminal 3 to perform a notification process, and an overlapping address is displayed in the mobile terminal 3. By performing such a notification process, the user recognizes that the transmission destination address designated by the operation panel 13 overlaps with the transmission destination address designated by the mobile terminal 3 and thus can resolve the overlapping state of transmission destination addresses by operating the operation panel 13. Then, when the notification process ends, the process proceeds to Step S28.

On the other hand, in a case where the same address is not included (No in Step S22), the image processing apparatus 2 acquires mail information from the mobile terminal 3 (Step S23) and automatically generates an electronic mail on which the mail information is reflected (Step S24). Then, the image processing apparatus 2 reads out image data 25 from the image storing unit 24 and attaches the image data 25 to the electronic mail (Step S25). Thereafter, the image processing apparatus 2 transmits the electronic mail to the transmission destination address designated on the address selection screen G1 of the operation panel 13 (Step S26).

Then, finally, the image processing apparatus 2 updates the history information 27 (Step S28). FIG. 9 is a diagram that illustrates an example of the history information 27. When the image data is transmitted through the mobile terminal 3 by using the image data transmitting function, the image processing apparatus 2, as illustrated in FIG. 9, records job execution date and time 27a, a job type 27b, a transmission destination address 27c, and identification information 27d of the mobile terminal 3 in the history information 27. Accordingly, by referring to the history information 27, a mobile terminal 3 through which the image data D3 has been transmitted to the outside can be acquired.

Next, an example of the operation of the mobile terminal 3 will be described. FIG. 10 is a flowchart that illustrates an example of the process sequence performed by the mobile terminal 3. This process is a process that is performed as the mobile terminal 3 executes the link program 61 and is a process that is performed by the link application 80 described above. When this process is started, first, the link application 80 of the mobile terminal 3 performs the process of pairing with the image processing apparatus 2 (Step S30) and establishes a state communicating with the image processing apparatus 2 (Step S31). Then, the link application 80 stands by until the startup instruction D1 is received from the image processing apparatus 2 (No in Step S32). When the startup instruction D1 is received (Yes in Step S32), the link application 80 starts up the electronic mail transmitting function unit 70 administering the electronic mail transmitting function (Step S33). Then, when the electronic mail transmitting function unit 70 is started up, the link application 80 instructs the electronic mail transmitting function unit 70 to display an address selection screen that is based on the address information 64 and displays the address selection screen on the display unit 52 (Step S34).

Then, the link application 80 stands by until the designation of a transmission destination address is notified from the electronic mail transmitting function unit 70 (No in Step S35). When the transmission destination address is notified (Yes in Step S35), the link application 80 generates transmission destination designation information D2 and transmits the generated transmission destination designation information D2 to the image processing apparatus 2 (Step S36).

Thereafter, the link application 80 stands by until the image data D3 is received from the image processing apparatus 2 (No in Step S37). When the image data D3 is received (Yes in Step S37), the link application 80 designates the image data D3 as an attached file and outputs the image data D3 to the electronic mail transmitting function unit 70 (Step S38). In this way, the electronic mail transmitting function unit 70 attaches the image data D3 to an electronic mail that is currently in the middle of an editing operation.

Thereafter, when mail information is acquired from the electronic mail transmitting function unit 70 (Step S39), the link application 80 transmits the mail information to the image processing apparatus 2 (Step S40). In addition, in a case where mail information is acquired from the image processing apparatus 2 in Step S39, the link application 80 outputs the mail information to the electronic mail transmitting function unit 70 in Step S40.

Then, the link application 80 stands by until the transmission of the electronic mail is completed by the electronic mail transmitting function unit 70 (No in Step S41). When the transmission of the electronic mail is completed (Yes in Step S41), the link application 80 transmits a transmission completion notification to the image processing apparatus 2 (Step S42), and the whole process ends.

As described above, the image processing system 1 according to one or more embodiments has a configuration in which the image processing apparatus 2 having the image data transmitting function and the mobile terminal 3 having the electronic mail transmitting function operate to be linked with each other. The image processing apparatus 2 includes: the startup instruction transmitting unit 32 that, in a case where the image data transmitting function is selected, transmits the startup instruction D1 of the electronic mail transmitting function to the mobile terminal 3 and displays address information managed using the electronic mail transmitting function in the mobile terminal 3; the image data acquiring unit 31 that acquires image data 25 that is a transmission target of the image data transmitting function; the transmission destination designation information acquiring unit 33 that acquires the transmission destination designation information D2 representing that the transmission destination address of the image data 25 acquired by the image data acquiring unit 31 from the mobile terminal 3 is designated after the startup instruction D1 is transmitted by the startup instruction transmitting unit 32; and the image data transmitting unit 36 that, in a case where transmission destination designation information D2 is acquired by the transmission destination designation information acquiring unit 33, transmits the image data D3 to the mobile terminal 3. In addition, the mobile terminal 3 includes: the electronic mail function starting unit 81 that starts up the electronic mail transmitting function in accordance with the reception of the startup instruction D1 from the image processing apparatus 2 and displays address information managed by the electronic mail transmitting function on the display unit 52; the transmission destination designation information transmitting unit 82 that receives an operation of designating a transmission destination address from among the address information displayed on the display unit 52 and transmits the transmission destination designation information D2 to the image processing apparatus 2; and the attached file output unit 84 that, in a case where image data D3 is received from the image processing apparatus 2, outputs the image data D3 as an attached file of the electronic mail generated using the electronic mail transmitting function.

According to such a configuration, since the image processing apparatus 2 and the mobile terminal 3 are linked with each other, and the address information is automatically displayed on the display unit 52 of the mobile terminal 3, the user can designate a transmission destination address of the image data D3 by quickly operating the mobile terminal 3. Then, when the transmission destination address is designated by the mobile terminal 3, the image data D3 is automatically transmitted from the image processing apparatus 2 to the mobile terminal 3, and the mobile terminal 3 can automatically attach the image data D3 to the electronic mail by setting the image data D3 as an attached file. Accordingly, the user's operation burden at the time of transmitting the image data D3 generated by the image processing apparatus 2 to the outside through the user's mobile terminal 3 can be markedly reduced, and the convenience of the image processing system 1 is improved.

In addition, when the image data D3 is transmitted to the mobile terminal 3, the image processing apparatus 2 described above is configured to convert the data format of the image data 25 stored in the image storing unit 24 into a data format that can be processed by the mobile terminal 3 or convert the image size of the image data 25 stored in the image storing unit 24 and then, transmit the converted image data to the mobile terminal 3. For this reason, the user does not need to manually perform such an image conversion, and more superior operability is achieved.

In addition, the image processing apparatus 2 includes: the address determining unit 34 that, in a case where transmission destination addresses are designated by a plurality of devices difference from each other, determines whether or not the same address is included in the transmission destination addresses designated by the plurality of devices; and the notification control unit 35 that notifies the user that the addresses overlap each other in a case where the same address is included. For this reason, in a case where an electronic mail to which the image data D3 is attached is simultaneously transmitted to a plurality of transmission destination addresses, it can be prevented in advance that an overlapping electronic mail is transmitted to the same transmission destination address.

Figure 11A:
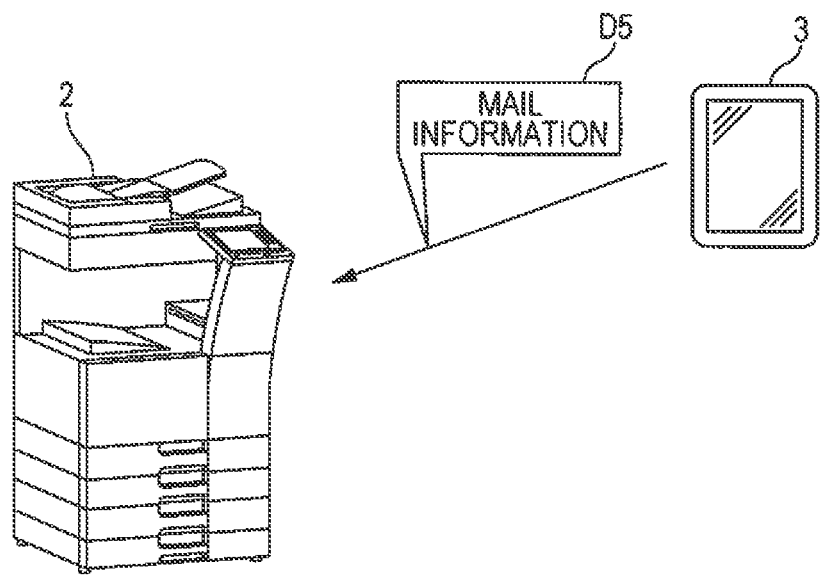
FIGS. 11A and 11B are diagrams that illustrate examples of communication of mail information between an image processing apparatus and a mobile terminal.

In addition, the image processing apparatus 2, as illustrated in FIG. 11A, can acquire the mail information D5 from the mobile terminal 3 and reflect information such as a title, a text, and the like included in the mail information D5 on the title, the text, and the like of an electronic mail generated by the image processing apparatus 2. For this reason, when the user manually inputs the title, the text, and the like by using his own mobile terminal 3 to which he is regularly accustomed, the information is automatically reflected on the electronic mail generated by the image processing apparatus 2, and accordingly, the user does not need to input the title, the text, and the like to the operation panel 13 to which the user is not accustomed in the operation method. Accordingly, the user's effort at the time of inputting the title, the text, and the like of the electronic mail can be reduced, which is efficient.

Figure 11B:
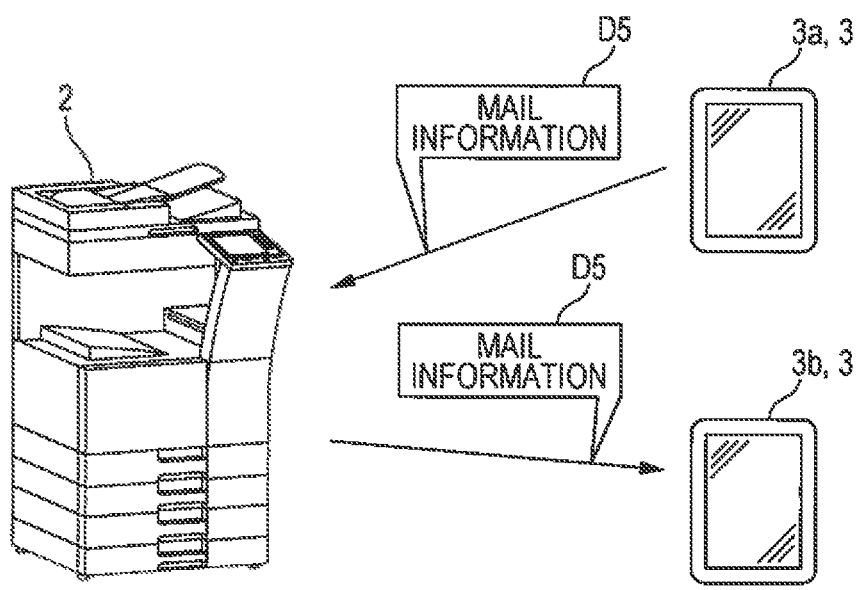

Furthermore, the image processing apparatus 2, as illustrated in FIG. 11B, can transmit the mail information D5 acquired from one mobile terminal 3a to the other mobile terminal 3b. For this reason, in a case where electronic mails are respectively transmitted from a plurality of mobile terminals 3a and 3b, in a case where the user manually inputs a title, a text, and the like to one mobile terminal 3a, the information is automatically reflected on an electronic mail generated by the other mobile terminal 3b, and accordingly, the operability is superior.

As above, while embodiments of the present invention have been described, the present invention is not limited to contents described in the embodiments described above, and it is apparent that various modified examples can be applied.

For example, in one or more embodiments described above, a case has been illustrated as an example in which, when a transmission destination address is designated by the image processing apparatus 2, the image processing apparatus 2 generates an electronic mail and transmits the generated electronic mail to the outside. However, the form in which the image processing apparatus 2 transmits the image data to the outside is not necessarily limited to the electronic mail. For example, the image processing apparatus 2 may transmit image data to the outside through FAX transmission.

Although the disclose has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:
1. An image processing system comprising:
an image processing apparatus having an image data transmitting function; and
a mobile terminal that links with the image processing apparatus and that includes an electronic mail transmitting function,
wherein the image processing apparatus comprises:
a startup instruction transmitter that transmits a startup instruction of the electronic mail transmitting function to the mobile terminal and displays address information managed by the electronic mail transmitting function in the mobile terminal when the image data transmitting function is selected;
a controller that:
acquires image data that is a transmission target in the image data transmitting function;
acquires transmission destination designation information that represents that a transmission destination address of the image data is designated from the mobile terminal after the startup instruction is transmitted by the startup instruction transmitter; and
transmits the image data to the mobile terminal when the transmission destination designation information is acquired from the mobile terminal, and
wherein the mobile terminal comprises:
an electronic mail function starting circuit that, accompanying reception of the startup instruction from the image processing apparatus, starts up the electronic mail transmitting function and causes a predetermined display to display address information managed by the electronic mail transmitting function;
a transmission destination designation information transmitter that receives an operation to designate a transmission destination address among the address information displayed by the display and transmits the transmission destination designation information to the image processing apparatus; and
a processor that outputs the image data as an attached file of an electronic mail generated by the electronic mail transmitting function when the image data is received from the image processing apparatus.

2. The image processing system according to claim 1, wherein the image processing apparatus further comprises an image storage that stores the image data, and
wherein, when the image data is transmitted to the mobile terminal, the controller converts a data format of the image data stored in the image storage into a data format that can be processed by the mobile terminal and then transmits the converted image data to the mobile terminal.

3. The image processing system according to claim 1, wherein the image processing apparatus further comprises an image storage that stores the image data, and
when the image data is transmitted to the mobile terminal, the controller converts an image size of the image data stored in the image storage and then transmits the converted image data to the mobile terminal.

4. The image processing system according to claim 1, wherein the controller further manages history information where a transmission history of the image data is recorded, and, after the image data is transmitted to the mobile terminal, records information that represents that the image data is transmitted through the mobile terminal in the history information together with identification information of the mobile terminal.

5. The image processing system according to claim 1, wherein the image processing apparatus further comprises:
an address storage that stores address registration information in which a plurality of addresses are registered; and
an address operation receiver that receives a selection operation of an address that is a transmission destination of the image data among the plurality of addresses registered in the address registration information, and
the controller, when the selection operation of the address that is the transmission destination of the image data is received by the address operation receiver, further transmits the image data to the address received by the address operation receiver.

6. The image processing system according to claim 5, wherein the controller further notifies a user that the plurality of addresses overlap with each other when the address received by the address operation receiver and the transmission destination address included in the transmission destination designation information are the same.

7. The image processing system according to claim 5, wherein the controller further:
acquires mail information that relates to the electronic mail generated by the electronic mail transmitting function from the mobile terminal, and
when the selection operation of the address that is the transmission destination of the image data is received by the address operation receiver, generates an electronic mail to be transmitted to the address received by the address operation receiver based on the acquired mail information and attaches the acquired image data to the electronic mail.

8. The image processing system according to claim 1, wherein the image processing apparatus simultaneously communicates with a plurality of mobile terminals, and wherein each of the plurality of mobile terminals comprises the electronic mail transmitting function.

9. The image processing system according to claim 8, wherein the controller further notifies the user that a plurality of addresses overlap with each other when a same address is included in a plurality of pieces of transmission destination designation information acquired from each of the plurality of mobile terminals.

10. The image processing system according to claim 8, wherein the controller further:
acquires mail information that relates to an electronic mail generated by the electronic mail transmitting function from one of the plurality of mobile terminals; and
transmits the acquired mail information to other mobile terminals among the plurality of mobile terminals.

11. An image processing apparatus that performs an operation to be linked with a mobile terminal having an electronic mail transmitting function, the image processing apparatus comprising:
a startup instruction transmitter that transmits a startup instruction of an electronic mail transmitting function to the mobile terminal and displays address information managed by the electronic mail transmitting function in the mobile terminal when the image data transmitting function transmitting image data is selected;
a controller that:
acquires image data that is a transmission target in the image data transmitting function;
acquires transmission destination designation information that represents that a transmission destination address of the image data is designated from the mobile terminal after the startup instruction is transmitted by the startup instruction transmitter; and
transmits the image data to the mobile terminal when the transmission destination designation information is acquired from the mobile terminal.

12. The image processing apparatus according to claim 11, further comprising:
an image storage that stores the acquired image data, wherein, when the image data is transmitted to the mobile terminal, the controller converts a data format of the image data stored in the image storage into a data format that can be processed by the mobile terminal and then transmits the converted image data to the mobile terminal.

13. The image processing apparatus according to claim 11, further comprising:
an image storage that stores the image data acquired by the controller,
wherein, when the image data is transmitted to the mobile terminal, the controller converts an image size of the image data stored in the image storage and then transmits the converted image data to the mobile terminal.

14. The image processing apparatus according to claim 11, wherein the controller further manages history information where a transmission history of the image data is recorded, and, after the image data is transmitted to the mobile terminal, records information that represents that the image data is transmitted through the mobile terminal in the history information together with identification information of the mobile terminal.

15. The image processing apparatus according to claim 11, further comprising:
an address storage that stores address registration information in which a plurality of addresses are registered; and
an address operation receiver that receives a selection operation of an address that is a transmission destination of the image data among the plurality of addresses registered in the address registration information, and
wherein the controller, when the selection operation of the address that is the transmission destination of the image data is received by the address operation receiver, further transmits the image data to the address received by the address operation receiver.

16. The image processing apparatus according to claim 15, wherein the controller further notifies a user that the plurality of addresses overlap with each other when the address received by the address operation receiver and the transmission destination address included in the transmission destination designation information are the same.

17. The image processing apparatus according to claim 15, wherein the controller further:
acquires mail information that relates to the electronic mail generated by the electronic mail transmitting function from the mobile terminal, and
when the selection operation of the address that is the transmission destination of the image data is received by the address operation receiver, generates an electronic mail to be transmitted to the address received by the address operation receiver based on the acquired mail information and attaches the acquired image data to the electronic mail.

18. The image processing apparatus according to claim 11, wherein the image processing apparatus simultaneously communicates with a plurality of mobile terminals, and wherein each of the plurality of mobile terminals comprises the electronic mail transmitting function.

19. The image processing apparatus according to claim 18, wherein the controller further notifies the user that a plurality of addresses overlap with each other when a same address is included in a plurality of pieces of transmission destination designation information acquired from each of the plurality of mobile terminals.

20. The image processing apparatus according to claim 18, wherein the controller further:
acquires mail information that relates to an electronic mail generated by the electronic mail transmitting function from one of the plurality of mobile terminals; and
transmits the acquired mail information to other mobile terminals among the plurality of mobile terminals.

21. A mobile terminal having an electronic mail transmitting function and that performs an operation to be linked with an image processing apparatus, the mobile terminal comprising:
an electronic mail function starting circuit that, accompanying reception of the startup instruction of the electronic mail transmitting function from the image processing apparatus, starts up the electronic mail transmitting function and causes a predetermined display to display address information managed by the electronic mail transmitting function;

a transmission destination designation information transmitter that receives an operation of designating a transmission destination address among the address information displayed by the display from the image processing apparatus and transmits transmission destination designation information to the image processing apparatus; and a processor that outputs image data as an attached file of an electronic mail generated by the electronic mail transmitting function when the image data is received from the image processing apparatus, wherein the transmission destination designation information represents that a transmission destination address is designated to the image processing apparatus.

22. A non-transitory recording medium storing a computer readable program executed by an image processing apparatus that performs an operation to be linked with a mobile terminal having an electronic mail transmitting function, the program causing a hardware processor of the image processing apparatus to perform:

transmitting a startup instruction of the electronic mail transmitting function to the mobile terminal and displaying address information managed by the electronic mail transmitting function in the mobile terminal when an image data transmitting function transmitting image data is selected;

acquiring image data that is a transmission target in the image data transmitting function;

acquiring transmission destination designation information after the startup instruction is transmitted, wherein the transmission destination designation information represents that a transmission destination address of the acquired image data is designated from the mobile terminal; and transmitting the acquired image data to the mobile terminal when the transmission destination designation information is acquired from the mobile terminal.

23. A non-transitory recording medium storing a computer readable program executed by a mobile terminal having an electronic mail transmitting function and that performs an operation to be linked with an image processing apparatus, the program causing a hardware processor of the mobile terminal to perform:

starting up the electronic mail transmitting function and causing a predetermined display to display address information managed by the electronic mail transmitting function accompanying reception of the startup instruction of the electronic mail transmitting function from the image processing apparatus;

receiving an operation to designate a transmission destination address among the address information displayed by the display and transmitting transmission destination designation information that represents that a transmission destination address is designated to the image processing apparatus; and outputting image data as an attached file of an electronic mail generated by the electronic mail transmitting function when the image data is received from the image processing apparatus.

* * * * *